(12) United States Patent
Restive et al.

(10) Patent No.: US 8,104,648 B2
(45) Date of Patent: Jan. 31, 2012

(54) MIXING APPLICATOR

(75) Inventors: Mario J. Restive, Frankfort, NY (US);
Jeffrey James Birt, Whitesboro, NY (US); Thomas Lowell Waggoner, Perrysburg, OH (US)

(73) Assignee: The Fountainhead Group, Inc., New York Mills, NY (US)

( * ) Notice: Subject to any disclaimer, the term of this patent is extended or adjusted under 35 U.S.C. 154(b) by 702 days.

(21) Appl. No.: 11/876,353

(22) Filed: Oct. 22, 2007

(65) Prior Publication Data

US 2009/0101670 A1    Apr. 23, 2009

(51) Int. Cl.
*G01F 11/20* (2006.01)
(52) U.S. Cl. ............................ 222/413; 222/334; 137/99
(58) Field of Classification Search .............. 222/1, 413, 222/145.6, 175, 334, 136, 412, 481.482, 222/160, 161, 145.5, 481.4; 137/99, 564.5, 137/82–92; 239/392, 306–319, 324, 273
See application file for complete search history.

(56) References Cited

U.S. PATENT DOCUMENTS

| | | | | |
|---|---|---|---|---|
| 3,549,048 A | * | 12/1970 | Goodman | 222/57 |
| 3,642,171 A | * | 2/1972 | Ernst | 222/59 |
| 3,920,223 A | | 11/1975 | Krueger | |
| 4,408,890 A | * | 10/1983 | Beckmann | 366/155.2 |
| 4,475,819 A | | 10/1984 | Balmer | |
| 4,651,765 A | * | 3/1987 | Beth | 137/99 |
| 4,838,703 A | * | 6/1989 | McMaster et al. | 366/168.2 |
| 5,645,345 A | | 7/1997 | O'Neill et al. | |
| 7,059,761 B2 | | 6/2006 | Gerber | |
| 2005/0016302 A1 | * | 1/2005 | Simpson et al. | 73/865.8 |

* cited by examiner

*Primary Examiner* — Lien Ngo
(74) *Attorney, Agent, or Firm* — George R. McGuire; Blaine T. Bettinger; Bond Schoeneck & King

(57) ABSTRACT

An applicator mixes an additive with a fluid stream and dispenses the resultant mixture. The applicator includes a housing having a fluid inlet, a downstream auger chamber, a downstream mixing chamber, and a flow path fluidly connecting the fluid inlet to the mixing chamber. A turbine auger assembly including an auger and a rotor is rotatably connected to the housing to move the additive towards the mixing chamber, help mix the additive with the fluid stream, and then disperse the mixture to the auger chamber, which includes a hopper port and a downstream auger chamber exit exposed to the mixing chamber. The turbine auger assembly is rotatably connected to the housing.

24 Claims, 6 Drawing Sheets

MIXING APPLICATOR

BACKGROUND OF THE INVENTION

1. Field of the Invention

The present invention relates generally to a mixing applicator and method for mixing an additive into a fluid stream, including additives such as grass seed, mulch, fertilizer, insecticide, and weed killer.

2. Description of Related Art

The use of applicators for lawn and garden care is well known. Currently, devices such as broadcast spreaders are used to apply grass seed as well as fertilizers and insecticides for lawn care purposes. These spreading devices are often too large to be hand-held or are incorporated into larger devices and thus cannot be hand-held. The size of these devices is effective, and even necessary, for treating large areas, but many lawn problems involve patchy damage such as fungus and insect damage. A hand-held device is preferable in these instances to deliver the localized coverage required.

Thus, there is a need in the art for an applicator that is simple, inexpensive, and reliable and that is capable of addressing both widespread and localized problems efficiently. There also is a need for an applicator that can conveniently dispense seeds and other additives in regulated amounts to provide uniform coverage with a minimal amount of waste.

BRIEF SUMMARY OF THE INVENTION

The present invention addresses the foregoing needs in the art by providing a mixing applicator that mixes an additive into a fluid stream.

According to one aspect of the invention, the applicator includes a housing having a fluid inlet, a downstream auger chamber, a downstream mixing chamber, and a flow path fluidly connecting the fluid inlet to the mixing chamber. A turbine auger assembly including an auger and a rotor is rotatably connected to the housing. When the fluid stream moves past the turbine, it moves both the turbine and the auger, which is coupled to the turbine, and moves the additive forward to the mixing chamber before helping mix the additive with the fluid stream and disperse the resultant mixture.

In another aspect of the invention, an applicator features a housing, an auger chamber, an additive supply, and an auger. The housing has a fluid inlet, a fluid outlet, and a flow path fluidly connecting the fluid inlet and the fluid outlet. The auger chamber is supported in the housing and has a downstream auger chamber exit proximate the fluid outlet. The additive supply provides an amount of additive to the auger chamber. The auger is rotatably disposed within the auger chamber for advancing additive supplied to the auger chamber to the downstream auger chamber exit. Additive exiting the auger chamber exit mixes with fluid exiting the fluid outlet to form a mixture.

An understanding of these and other features of the present invention may be had with reference to the attached figures and following description, in which the present invention is illustrated and described.

BRIEF DESCRIPTION OF THE SEVERAL VIEWS OF THE DRAWING(S)

DETAILED DESCRIPTION OF THE INVENTION

Preferred embodiments of the invention will now be described with reference to the accompanying Figures.

Figure 1:
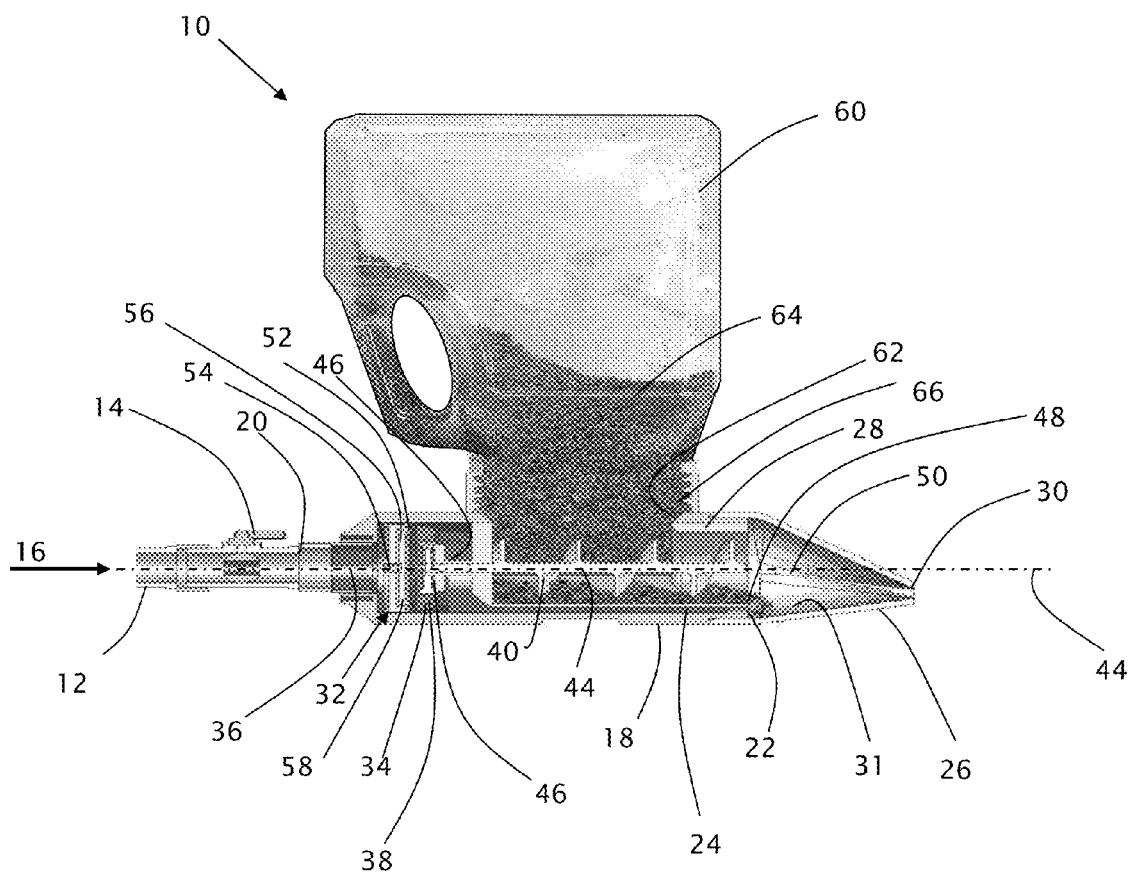
FIG. 1 is a cross-sectional view of an applicator according to a preferred embodiment of the present invention.

FIG. 1 shows a mixing applicator 10 according to a first preferred embodiment. A garden hose 12 is attached to the applicator 10 with a connection that has an on-off valve 14. The garden hose 12 supplies a motive fluid 16 to the applicator 10, and the valve 14 selectively allows the motive fluid to enter the applicator. The applicator 10 has an applicator main housing 18 with a fluid inlet 20, a fluid outlet 22 and a passageway or flow channel 24 (shown in FIG. 1) fluidly connecting the fluid inlet 20 to the fluid outlet 22. The fluid outlet 22 is in fluid communication with a downstream discharge nozzle 26.

FIG. 1 illustrates a cross-section of the applicator main housing 18. The applicator main housing 18 supports an auger chamber 28 intermediate the fluid inlet 20 and the fluid outlet 22 such that the flow channel 24 bypasses the auger chamber 28 between the fluid inlet 20 and the fluid outlet 22. The auger chamber 28 can also be configured such that more than one flow channel 24 exists between the fluid inlet 20 and the fluid outlet 22. That is, there could be multiple flow channels 24 supplying the motive fluid 16 to the discharge nozzle 26. Alternate embodiments could position the auger chamber 28 to form the flow channel 24 as an annular path around a portion of the auger chamber 28. The discharge nozzle 26 has a nozzle outlet 30 and has incorporated pattern flutes 31, which can be used to change the dispersion pattern at the discharge. These flutes could take many different forms.

The applicator main housing 18, as shown in FIG. 1, also contains a turbine auger assembly 32 including a rotor 34 rotatable about a rotor axis 36. The rotor includes one or more turbine blades 38, hereafter referred to as blades 38. The turbine auger assembly 32 also includes an auger 40 which is in mechanical communication with the rotor 34. The auger 40 includes an auger shaft 42 rotatably supported in the auger chamber 28 for rotation about an auger axis 44. The rotor 34 is coupled to the auger 40 via planetary gears or reducing gears 46, or the like, such that the rotation of the rotor 34 is transferred via the reducing gears 46 to the auger shaft 42. The reducing gears 46 are designed to translate a high rotational speed of the blades 38 to maximize torque in the auger 40, as will be described in more detail below.

The auger chamber 28 terminates in a downstream end at an auger chamber exit 48, which leads to a downstream mixing chamber 50. As will be described in more detail below, the motive fluid, introduced into the mixing chamber via the flow channel 24, mixes with an additive introduced into the mixing chamber through the auger chamber 28. In another embodiment, the mixing chamber can also be incorporated into the applicator main housing 18 and mixing can also continue in the discharge nozzle 26 to increase mixing efficiency.

An optional flow diverter 52 located intermediate the applicator fluid inlet 20 and the turbine auger assembly 32 is also illustrated in FIG. 1. The flow diverter 52 aids in imparting rotational motion on the auger assembly 32. Specifically, the flow diverter 52 has a diverter axis 54 coincident with the turbine axis 36 and two diverter channels 56 that have openings 58 located equidistant from the center of the flow diverter 52. The flow diverter is arranged such that the motive fluid from the hose 12 enters the diverter channels 56 and exits the diverter through the openings 58, which are positioned to direct the motive fluid to impinge upon the turbine blades 38 at a position to optimize the speed of the rotor 34. In another embodiment, the flow diverter could be incorporated into the design of the turbine auger assembly 32. This could be accomplished, for example, by designing the blades 38 to move fluid to a location that maximizes the speed of the rotor 34.

The auger chamber 28 supports a hopper 60 containing an additive 64. The hopper 60 feeds the additive into the auger chamber 28 through a hopper port 62, via gravity. The hopper 60 is securely attached to the applicator main housing 18 with a threaded connection 66. It is understood in the industry that this threaded connection could take other forms that are preferably releasable, such as a clamped connection. Portions of the hopper may comprise transparent or translucent materials, so a user can visually verify an amount of remaining additive. Indicia may also be present on the hopper to indicate how much additive is remaining. Other embodiments could have more than one hopper or could have multiple chambers within the hopper.

To use the applicator 10, the hopper 60 is filled with an additive 64 and attached to the applicator main housing 18 via the threaded connection 66. The combined applicator and hopper are then inverted as shown in FIG. 1 so that the additive 64 can move to the auger chamber 28, via gravity. The additive can be any number of products, including hydro-seeding materials, lawn care products such as mulch (straw or other matter with relatively larger pieces), seeds (grass, flower and vegetable seeds, for example), soil conditioners, pesticides, fertilizer and other chemicals or compositions. The garden hose 12 is then connected to the main applicator housing 18 of the applicator 10. When the on-off valve 14 is turned on, the motive fluid 16 enters the applicator 10 at the fluid inlet 20. At least some of the motive fluid flows through the flow diverter 52 to the turbine auger assembly 32, where the motive fluid 16 impinges on the blades 38 to deliver some of its kinetic energy to the rotor 34. This causes the rotor 34 to spin at a relatively high speed (RPM).

The rotary motion of the rotor 34 is transferred to the auger 40 through the reducing gears 46. The reducing gears 46 reduce the high-speed rate of the rotor 34 to correspondingly increase the torque of the auger shaft 42. The additive 64, which is gravity fed from the hopper 60 through the hopper port 62 into the auger chamber 28, is then transferred toward the auger chamber exit via the rotating auger 40. In the preferred embodiment of the applicator 10 as shown in FIG. 1, the rotor 34, the reducing gears 46, and the auger shaft 42 have coincident axes, which keeps the applicator in balance and helps make the applicator a more efficient and cost-effective device.

The flow channel 24 allows fluid to move from the fluid inlet 20 through the flow diverter 52 past the rotor 34 toward the mixing chamber 50. At the same time, the rotation of the auger 40 induces the additive 64 through the auger chamber exit 48 to the mixing chamber 50 so that the additive is mixed in the mixing chamber 50 with the motive fluid stream 16. This mixture then is moved through the discharge nozzle 26 for application to a lawn or the like. Valves and other controls well known in the industry can be incorporated to control the movement of the additive 64 from the hopper 60 as it moves toward the mixing chamber 50. The discharge nozzle 26 is pointed to the area to be treated before the operator turns on the on-off valve 14, which allows water to move into the applicator mixing the hydro-seeding material with the motive fluid 16 so that the resultant mixture 94 can be disbursed as a directed stream 96 over the required area. In this way, the applicator facilitates treatment of individual patches or small areas of lawn.

The motive fluid 16 supplied by the garden hose 12, or other sources as are known in the art, is used to supply the applicator 10 with the power necessary to combine and distribute the mixture into the directed stream 96. The high velocity fluid exiting the flow channel 24 transfers some of its kinetic energy to the additive 64 that has been transferred by the auger 40 to the mixing chamber 50 so that the resultant mixture 94 can be distributed at the desired application rate and pattern to treat the desired area.

Since the applicator has a separate auger chamber in this embodiment, any dry particular matter used as the additive 64 is only exposed to the motive fluid stream 16 when it is delivered by the auger 40 to the mixing chamber 50. The remaining additive 64 located in the hopper 60 remains dry. When the applicator 10 is not in use, the additive 64 can be stored in the hopper 60 which can be releasably removed from the hopper port 62 and covered.

Figure 2:
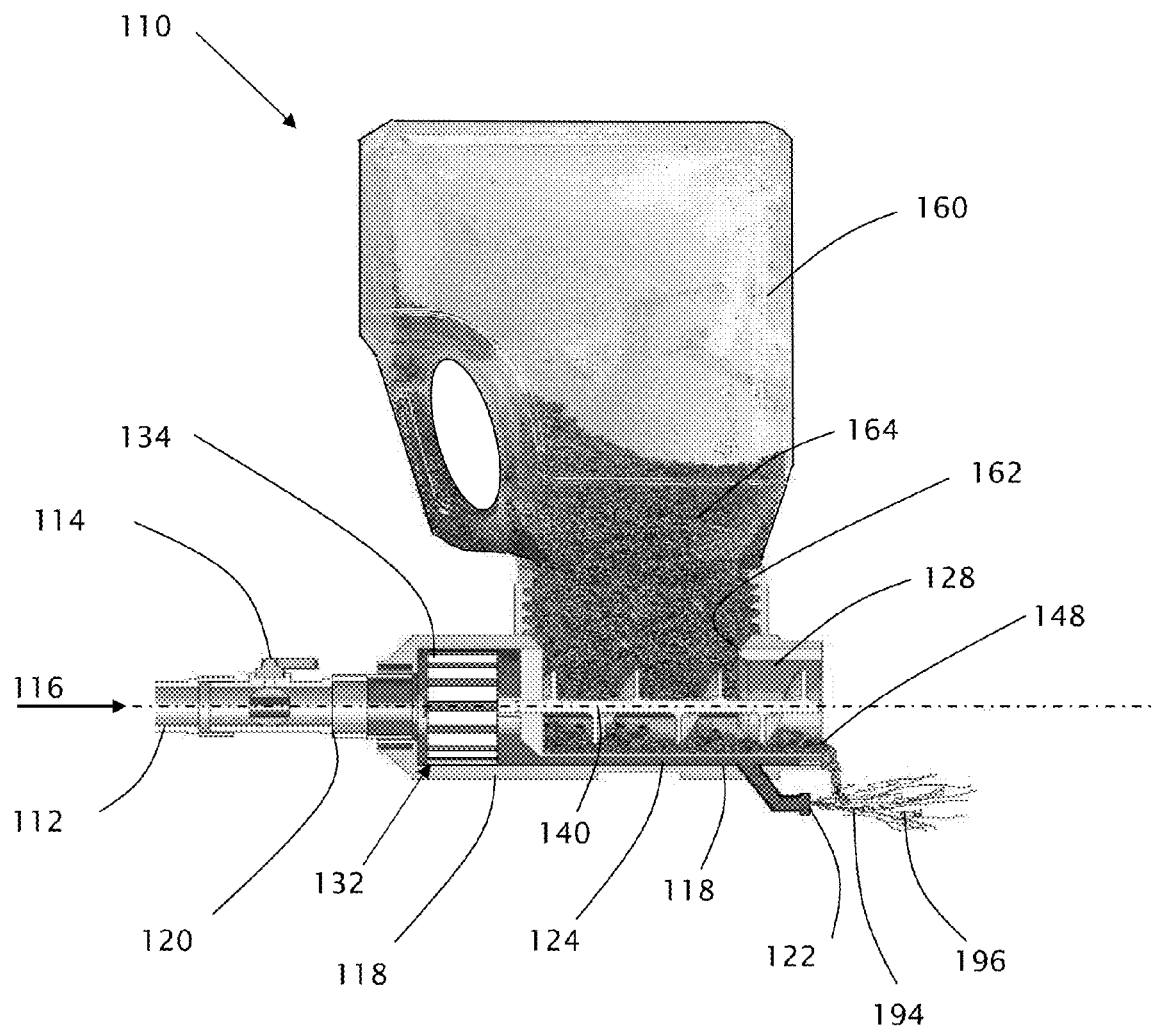
FIG. 2 is a cross-sectional view of an applicator according to another preferred embodiment of the present invention.

Of course, modifications to the invention also are contemplated. For example, one alternative embodiment of the invention is illustrated in FIG. 2. As illustrated therein, an applicator 110 is similar to that illustrated in FIG. 1, but the applicator 110 has no mixing chamber. More particularly, auger 140, which is generally the same as that described with reference to FIG. 1, advances additive 164 to an auger chamber exit 148 consisting of an open end of an auger chamber 128. The auger chamber exit 148 of this embodiment is open to the atmosphere, such that when the auger 140 forces the additive 164 out the auger chamber 148, the particulate additive leaves the applicator 110 and enters the atmosphere. In this embodiment, motive fluid 116 is arranged to mix with the additive in the atmosphere, i.e., outside the applicator 110.

Also in the embodiment of FIG. 2, a flow channel 124 includes an offset or elbow 125 that locates the fluid outlet 122 at a distance spaced below the point at which the additive leaves the auger chamber 128. A nozzle 126 preferably also is provided on the fluid outlet 122 to direct flow of the motive fluid 116. The inventors also contemplate that this embodiment may not include the offset 125, in which case the fluid outlet 22 may be situated adjacent to and below the open end of the auger chamber 128, for example, as shown in FIG. 4. In either of these configurations, the additive falls substantially vertically into the substantially horizontal jet of motive fluid 94 emanating from the fluid outlet 122. The motive fluid 114 redirects and mixes with the additive 164 to spray a mixture 194 of motive fluid 114 and additive 164 over an area to be treated.

In an alternative embodiment, the fluid outlet may comprise more than one nozzle. For example, FIG. 3 illustrates an embodiment in which the fluid outlet 122 comprises two nozzles 126 arranged substantially vertically relative to each other. In this configuration, any additive that may pass through the stream of motive fluid ejected from the upper nozzle, is mixed with and redirected by the second, lower stream of motive fluid to successfully apply a mixture of the fluid and the additive over an area to be treated.

As illustrated in FIGS. 2 and 3, the downstream end of the auger chamber 128 is open to the atmosphere, such that additive 164 passing therethrough falls unfettered into the stream of motive fluid 116 ejected from the applicator 110 below the auger chamber 128. However, when the downstream end of the auger chamber 128 is open as in these configurations, tipping of the applicator 110 in a forward direction may result in unintended spillage or discharge of the additive 164. Moreover, when the applicator 10 is not in use, additive 164 may exit the applicator 110 through the open end.

Figure 4:
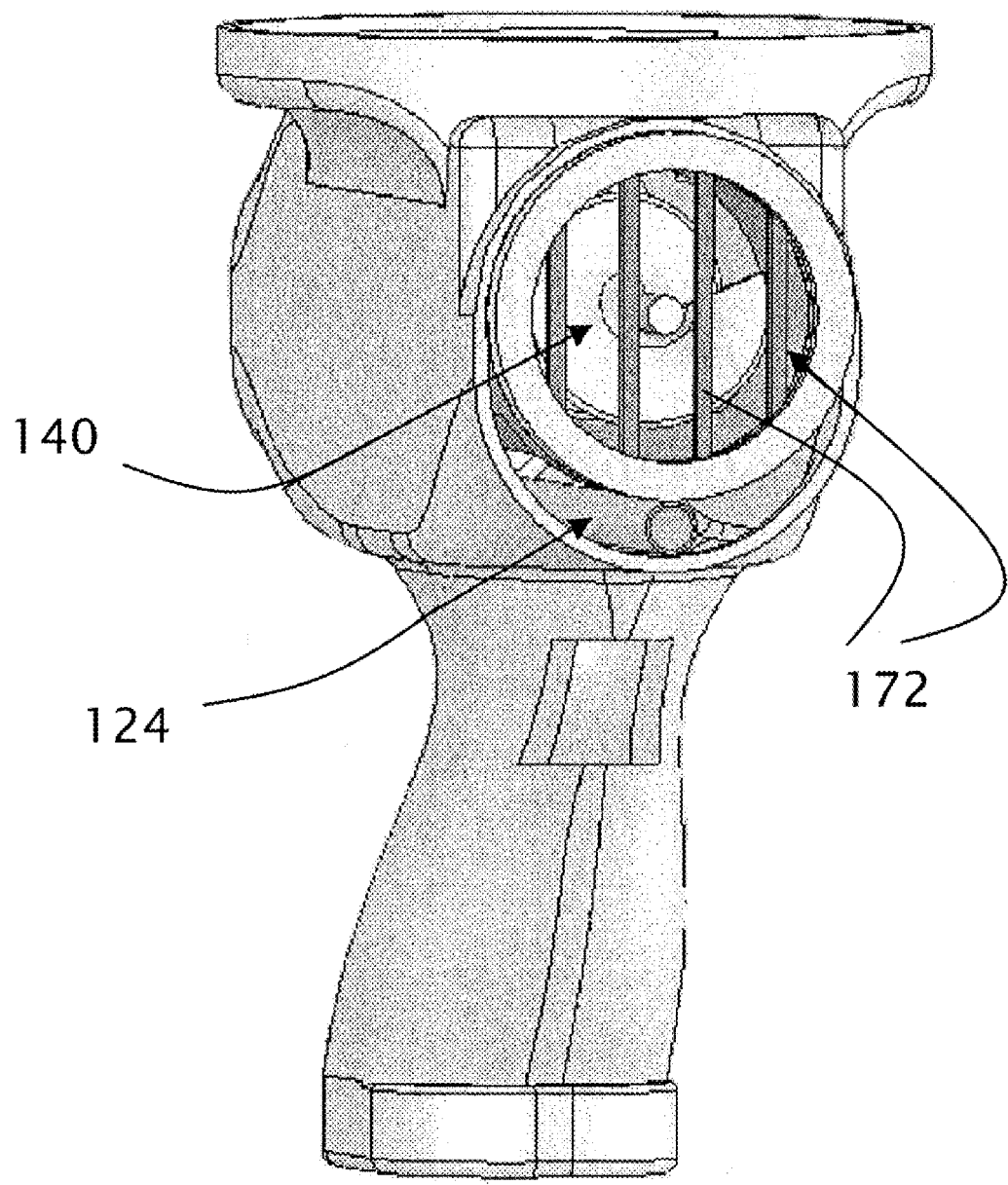
FIG. 4 is a perspective view of an applicator according to a still further preferred embodiment of the present invention.

To minimize unintended discharge of the additive 164, the present invention preferably also provides a partial covering for the open end of the auger chamber 128 to regulate and/or impede the amount of additive 164 passing through the opening. FIG. 4 illustrates an example of such a configuration.

In FIG. 4, a partial covering for the open end of the auger chamber includes an elastic curtain 170 comprising a plurality of vertical, spaced-apart bands 172. The bands 172 create a barrier to maintain the additive 164 within the auger chamber 128 until the auger 140 forces the additive from the auger chamber, namely, between the bands. As will be understood, when the spacing of the bands 172 is decreased, i.e., the bands 172 are positioned relatively closer to each other, the additive is less likely to inadvertently escape through the opening, but a greater force is required by the auger to force the particles between the bands. Conversely, when the bands 172 are spaced relatively farther apart, less pressure by the auger is required to expel the additive, but it is more likely that additive will inadvertently escape between the bands 172. The inventors have found that the elastic bands preferably are spaced a distance that is twice the size of the largest particle of additive to be used in the applicator. This spacing has been found to maintain a majority of the additive 164 inside the auger assembly when not in use or when tipped forward, but allows for a relatively low pressure to forcefully eject the additive 164 through the curtain 170.

Alternative configurations of the elastic curtain also are contemplated. For example, the elastic bands need not be disposed vertically, but may instead be horizontal, diagonal, or crisscrossed. Moreover, although the bands preferably are elastic, they also may be inelastic. For example, rigid bars or a grate may be used in place of the curtain, although, as will be understood, rigid members are less likely to allow passage of oversized particles. As a result, an inflexible curtain is more likely to become blocked, and thus not allow passage of additive therethrough.

In another configuration, the curtain may comprise two or more portions movable relative to each other. For example, an outer portion having one or more apertures therethrough may be movable relative to an inner portion having one or more apertures. Appropriate positioning of the portions relative to each other may selectively align the apertures and thus provide openings through which additive may be expelled from the auger chamber. Such a configuration would allow a user to select an amount of additive that is to be expelled from the applicator.

Figure 3:
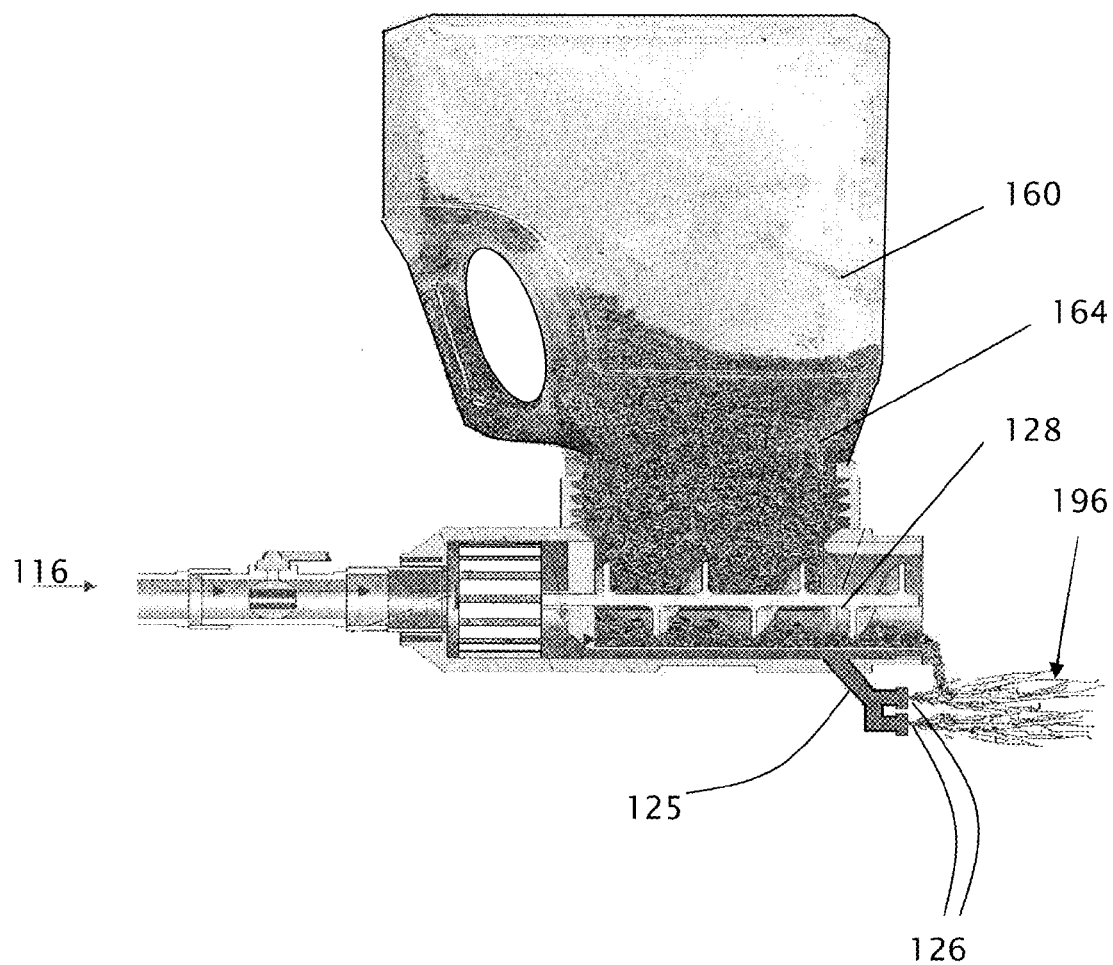
FIG. 3 is a cross-sectional view of an applicator according to a further preferred embodiment of the present invention.

The applicator 110 also may include a removable cap (not shown) to selectively cover the open end of the auger chamber, for example, when the applicator is not in use. The removable cap may be configured for placement over the curtain as illustrated in FIG. 4, or over the open end as used in the embodiments of FIGS. 2 and 3. The applicator 110 of FIGS. 2-4 is used in substantially the same manner as the applicator 10 of FIG. 1, the main difference being that a mixing chamber is not provided within the applicator. Other differences also will be apparent from the foregoing discussion.

Figure 5:
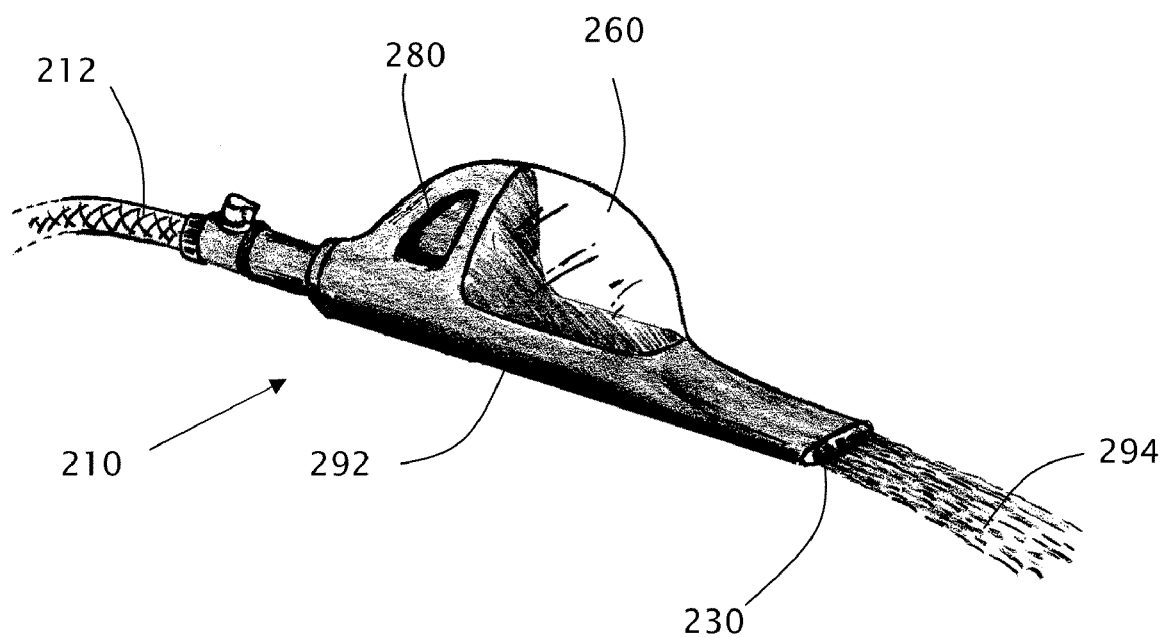
FIG. 5 is a perspective view of an applicator according to yet another preferred embodiment of the present invention.

FIG. 5 shows another embodiment of a slim, hand-held applicator 210 (hereinafter called a slim applicator 210) with an integrated hopper 260 having a fluid inlet and a fluid outlet. The slim applicator 210 incorporates the integrated hopper in such a way that the integrated hopper 60 can be opened to add additive. The slim applicator also incorporates a handle 280 and a nozzle 230 as part of a slim applicator body such that the mixing chamber, which is not shown, is contained within the slim applicator body upstream of the outlet similar to the arrangement in FIG. 1. This applicator 210 preferably is also designed with a flat bottom for stability when being filled with an additive.

Other embodiments of the applicator can include a stand and/or a contoured hopper lid to facilitate filling of the hopper. The applicator can also have a shoulder harness and a variable on-off switch such as a quick release on the discharge nozzle. Another embodiment could incorporate a ball joint connection upstream of the fluid inlet to reduce hose tension.

Figure 6:
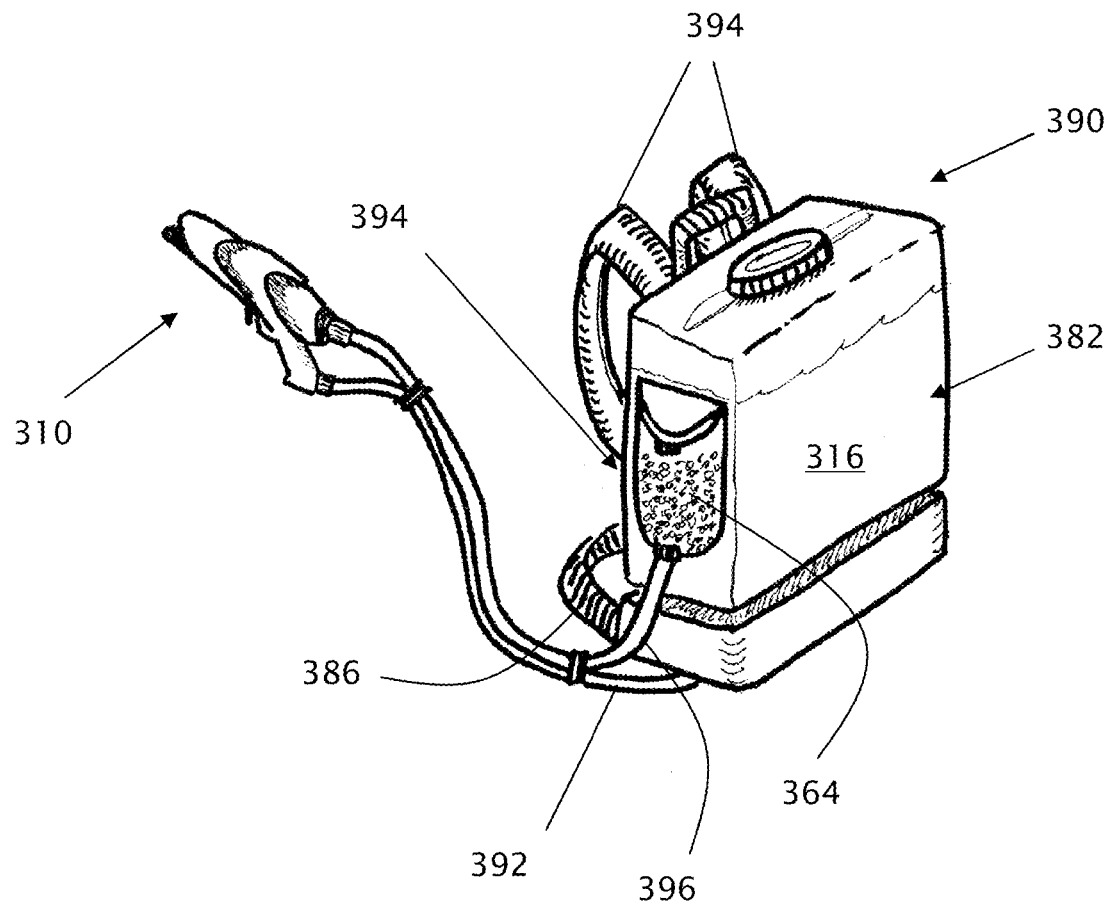
FIG. 6 is a perspective view of an applicator according to another preferred embodiment of the present invention.

FIG. 6 illustrates yet another embodiment of the present invention. In this embodiment, an applicator 310 is used in conjunction with a portable backpack 390. This embodiment is particularly useful when a garden hose is not available to supply water as the motive fluid. The backpack 390 preferably includes a reservoir 382 holding a motive fluid 316 and a pair of shoulder straps 384. A belt 386 also may be provided for added support of the reservoir on the user's back and a handle 388 may be provided for carrying the backpack 380 when the backpack is not being worn.

The motive fluid within the reservoir preferably is pressurized. Pumps and the like for pressurizing fluid reservoirs are well known in the art and will not be discussed in detail herein. Preferably, a hand pump (not shown) is provided for easy manipulation by a user during use. Alternatively, it may be necessary to remove the back pack 390 to pressurize and re-pressurize the reservoir 382. A hose 392 is provided in communication with the reservoir 382 to supply the motive fluid 316 from the reservoir to the applicator 310, which may be similar to any of the applicators 10, 110, 210 described above in connection with FIGS. 1 through 5.

Like the applicators described above with reference to FIGS. 1 through 5, the applicator 310 may also support or incorporate a hopper supplying an additive 364. Alternatively, the backpack 390 may include a second reservoir 394 containing an additive 364. A conduit 396 is provided between the second reservoir 394 and an auger chamber (not shown) of the applicator 310 to feed the additive 364 into the applicator 310. Preferably, the additive is gravity-fed through the conduit 394. However, known mechanical means may be employed to ensure a steady supply of the additive to the applicator 310.

While the invention has been described in connection with presently preferred embodiments thereof, those skilled in the art will recognize that many modifications and changes may be made without departing from the true spirit and scope of the invention. The invention is intended to be defined solely by the appended claims.

The invention claimed is:

1. An applicator comprising:
    a housing having a fluid inlet, a fluid outlet, and a flow path fluidly connecting the fluid inlet and the fluid outlet;
    an auger chamber supported in the housing and having a downstream auger chamber exit proximate the fluid outlet;
    an additive supply providing an amount of additive to the auger chamber; and
    an auger rotatably disposed within the auger chamber for advancing additive supplied to the auger chamber to the downstream auger chamber exit,
    wherein additive exiting the auger chamber exit mixes with fluid exiting the fluid outlet to form a mixture.

2. The applicator of claim 1, further comprising a rotor in communication with the auger, wherein the rotor comprises one or more blades and the blades are disposed in the flow path such that motive fluid passing through the flow path impinges on the blades to impart a rotation on the rotor.

3. The applicator of claim 1, further comprising a rotor in communication with the auger, and a reducing gear intermediate the rotor and the auger.

4. The applicator of claim 1, further comprising a rotor in communication with the auger, and a flow diverter intermediate the fluid inlet and the rotor, the flow diverter directing the flow path to intersect the rotor at a radius from a rotor axis.

5. The applicator of claim 4, wherein the rotor axis is co-axial with an axis of rotation of the auger.

6. The applicator of claim 1, further comprising a cover positioned over a portion of the auger chamber exit, the cover comprising an elastic curtain including one or more elastic bands.

7. The applicator of claim 6, wherein the elastic bands of the elastic curtain are spaced a distance that is approximately twice the size of the additive supplied to the auger chamber exit.

8. The applicator of claim 1, further comprising a cover comprising two portions movable relative to each other to selectively provide an opening through which additive exits the auger chamber exit.

9. The applicator of claim 1, wherein the fluid outlet is positioned below the auger chamber exit and wherein the auger chamber exit is open to the atmosphere such that additive exiting the auger chamber exit falls into a stream of motive fluid emanating from the fluid outlet, thereby mixing the additive and motive fluid and forming a directed stream of the resultant mixture.

10. The applicator of claim 9, further comprising a nozzle downstream of the fluid outlet through which motive fluid communicated from the fluid inlet to the fluid outlet exits the applicator.

11. The applicator of claim 9, further comprising first and second nozzles downstream of the fluid outlet through which motive fluid communicated from the fluid inlet to the fluid outlet exits the applicator, the first and second nozzles being arranged respectfully above and below each other.

12. The applicator of claim 1, further comprising a backpack, the backpack having at least one of a first reservoir containing a motive fluid and a second reservoir containing the additive supply.

13. An applicator comprising:
(a) a housing having a fluid inlet, a downstream mixing chamber, and a flow path fluidly connecting the fluid inlet to the mixing chamber;
(b) an auger chamber supported in the housing, the auger chamber having a hopper port and a downstream auger chamber exit exposed to the mixing chamber; and
(c) a turbine auger assembly rotatably connected to the housing, the turbine auger assembly having an auger in the mixing chamber and a rotor in the flow path.

14. The applicator of claim 13, further comprising a reducing gear intermediate the auger and the rotor, the reducing gear disposed in at least one of the flow path and the auger chamber.

15. The applicator of claim 13, wherein the rotor rotates about a rotor axis and the auger rotates about the rotor axis.

16. The applicator of claim 13, further comprising a flow diverter intermediate the fluid inlet and the rotor, the flow diverter directing the flow path to intersect the rotor at a radius from a rotor axis.

17. The applicator of claim 13, further comprising a discharge nozzle downstream of the auger chamber exit.

18. The applicator of claim 17, wherein the mixing chamber is within the nozzle.

19. The applicator of claim 13, wherein the fluid inlet is concentric with at least one of the rotor and the auger.

20. A method of entraining an additive with a fluid flow, the method comprising:
rotating a turbine blade and a coupled auger by impacting the fluid flow against and past the turbine blade; and
introducing the additive to the fluid flow with the rotating auger;
wherein the fluid flow that impacts and moves past the turbine blade flows downstream and mixes with additive.

21. The method of claim 20 wherein introducing the additive includes entraining the additive with the fluid flow downstream of impacting the turbine-driven auger with the fluid flow.

22. The method of claim 20 further comprising diverting an incoming flow stream to produce multiple similar streams to impact the turbine blade.

23. An applicator for entraining an additive in a fluid stream, comprising:
a main housing having an auger chamber, a hopper port in the auger chamber, a flow channel and a mixing chamber; and
a turbine-driven auger rotatably disposed within the housing wherein at least a portion of the auger is located within the auger chamber;
wherein said fluid stream causes rotation of the turbine-driven auger by impacting the fluid stream against and past the turbine, and further wherein the fluid stream that impacts and moves past the turbine blade flows downstream and mixes with additive.

24. An applicator for entraining an additive in a fluid stream, comprising:
a main housing supporting an auger chamber and having a fluid inlet, a flow channel fluidly connected to the inlet, and a mixing chamber downstream from the flow channel;
an auger disposed in the auger chamber and rotatable relative to the auger chamber; and
a turbine, outside the auger chamber, coupled to the auger;
wherein said fluid stream causes rotation of the auger by impacting and moving past the turbine, and further wherein the fluid stream that impacts and moves past the turbine flows downstream and mixes with additive in the mixing chamber.

* * * * *